United States Patent
Hutchins

(10) Patent No.: US 6,264,577 B1
(45) Date of Patent: Jul. 24, 2001

(54) SMART SPLICE

(75) Inventor: Thomas Goodsell Hutchins, Uniontown, OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 0 days.

(21) Appl. No.: 09/230,598

(22) PCT Filed: Aug. 23, 1996

(86) PCT No.: PCT/US96/13884

§ 371 Date: Jan. 27, 1999

§ 102(e) Date: Jan. 27, 1999

(87) PCT Pub. No.: WO98/07643

PCT Pub. Date: Feb. 26, 1998

(51) Int. Cl.[7] .............................. F16H 7/22; B65G 43/00
(52) U.S. Cl. ................. 474/106; 198/810.02; 198/502.1
(58) Field of Search ...................... 474/106; 198/810.02, 198/810.03, 810.2, 810.3, 810.4, 502.1, 502.4, 847, 856, 572, 810.04

(56) References Cited

U.S. PATENT DOCUMENTS

| 3,973,670 | 8/1976 | Spaar ................................. 198/193 |
| 4,087,800 | 5/1978 | Lee ..................................... 340/259 |
| 4,437,563 | 3/1984 | Oriol ................................... 198/810 |
| 4,447,807 | 5/1984 | Klein et al. ......................... 340/676 |
| 4,463,434 | 7/1984 | Haylett et al. ...................... 364/507 |
| 4,621,727 * | 11/1986 | Strader ............................... 198/810 |
| 4,646,912 | 3/1987 | Houck et al. ....................... 198/810 |
| 4,653,633 | 3/1987 | Jacobs ................................ 198/810 |
| 4,854,446 | 8/1989 | Strader ............................... 198/810 |
| 5,168,266 | 12/1992 | Fukuda ............................... 340/676 |
| 5,181,975 | 1/1993 | Pollack et al. ................... 152/152.1 |
| 5,218,861 | 6/1993 | Brown et al. ...................... 73/146.5 |
| 5,328,023 * | 7/1994 | Hinklelmann et al. ............. 198/847 |
| 6,047,814 * | 4/2000 | Alles et al. ..................... 198/810.02 |

FOREIGN PATENT DOCUMENTS

| 4435842 * | 4/1996 | (DE) . |
| 4444262 * | 4/1996 | (DE) . |
| 4444264 * | 4/1996 | (DE) . |
| 4444263 * | 5/1996 | (DE) . |
| 19525326 | 10/1996 | (DE) ............................. B65G/43/02 |
| 082476 * | 6/1983 | (EP) . |
| 787669 * | 8/1997 | (EP) . |

* cited by examiner

Primary Examiner—David A. Bucci
Assistant Examiner—Marcus Charles
(74) Attorney, Agent, or Firm—Emerson & Skeriotis

(57) ABSTRACT

A conveyor belt (10) contains at least one integrated circuit transponder (30) which, upon interrogation by an external radio signal, transmits identification information in digitally encoded form. The transponder (30) has a generally planar, circular antenna (36A) surrounding a printed circuit board to which an integrated circuit is attached. The transponder may be encased in a rigid epoxy material to protect the structure from damage during use. Transponders placed adjacent splices (60, 62, 64) in a splice segment provide non-contact means of locating and monitoring the repair.

20 Claims, 4 Drawing Sheets

SMART SPLICE

TECHNICAL FIELD

This invention pertains generally to the art of conveyor belt identification means and more specifically to the use of an embedded integrated circuit transponder which is interrogated to transmit belt identification and other data.

1. Background Art

In the manufacture of conveyor belts it is desirable to provide unique identification for each belt, A currently used procedure molds an alphanumeric "brand" onto the belt surface. The brand normally identifies the belt type, the date of manufacture and the belt section. In addition, at times splices are needed to repair damaged segments of a conveyor belt. It is also convenient to brand the spliced segments so as to monitor the success of the repair effort. With prior art devices, the information contained on the brand is readable only while the belt is nonoperative and relatively free from excess debris In the art it is known that monitoring the condition of an endless conveyor belt during usage can prevent irreparable belt damage and needless production delays. The presence of rip detection coils embedded within the layers of a conveyor belt is one tool used for such monitoring. For the most part, the embedded devices are passive antennae which serve as coupling devices when specific sections of the belt pass by a rip detection station. Generally, an electrical current is induced in an antenna, and if a sufficiently strong signal is received from the antenna, it is presumed that the integrity of the belt is maintained. An insufficiently transmitted signal, on the other hand, may indicate the presence of a longitudinal rip in the belt surface requiring immediate attention.

The present invention relates to an endless conveyor belt having an integrated circuit transponder embedded within the structure of the conveyor belt for use in belt or belt section identification. The transponder is a passive device which depends upon the receipt of an interrogation signal emanating from an outside source. The interrogation signal is rectified by the integrated circuit transponder, which then transmits an electrical signal digitally encoded to identify the belt or belt section. A unique "digital brand" can be used for each belt or belt section.

The present invention provides a non-contact means for identifying a conveyor belt, or belt section, and monitoring thereof which is simple and efficient while providing better and more advantageous results.

2. Disclosure of Invention

According to another aspect of the invention, an endless conveyor belt having an elastomeric body, a top cover, a pulley cover, and a reinforced layer disposed between and coextensive with the top cover and the pulley cover, a splice in the top cover, a splice in the pulley cover, and a first splice in the reinforced layer due to a splice in the belt is characterized by:
a first integrated circuit transponder being located in the reinforced layer in close proximity to the first splice for use in splice identification and monitoring.

According to another aspect of the invention, the conveyor belt further comprises a second integrated circuit transponder which is positioned with the pulley cover near the periphery of the pulley cover and the reinforced layer.

According to another aspect of the invention, the first transponder comprises an antenna comprising an electrical coil having a plurality of bunched turns, the coil being substantially planar, the plane of the coil being substantially parallel with the belt surfaces; and, a printed circuit board attached to the coil, the integrated circuit of the first transponder being mounted on the circuit board.

According to another aspect of the invention, a method of locating a splice in a conveyor belt comprises the steps of:

embedding an integrated circuit transponder in the structure of the conveyor belt near the splice, the transponder being able to transmit an electrical signal in response to an oscillating electric or magnetic field emanating from a source in contact with or spaced from the belt;

interrogating the transponder with the oscillating electric or magnetic field; and, receiving the transmitted electrical signal from the transponder.

According to another aspect of the invention, a conveyor belt identification system comprises:

a transducer embedded within the belt structure, the transducer being encoded with predetermined identification data, the transducer being able to transmit the data in response to an oscillating electric or magnetic field emanating from a source in contact with or spaced from the belt; and, means for receiving the transmitted identification data.

According to another aspect of the invention, a method of locating a splice in a conveyor belt is characterized by the steps of embedding an integrated circuit transponder in the structure of the conveyor belt near the splice, the transponder being able to transmit an electrical signal in response to an oscillating electric or magnetic field emanating from a source in contact with or spaced from the belt; interrogating the transponder with the oscillating electric or magnetic field, and receiving the transmitted electrical signal from the transponder.

One advantage of the present invention is the provision of non-contact means for identifying a conveyor belt or belt section.

Another advantage of the present invention is the provision of a quick and precise method of monitoring a repair in a conveyor belt.

Still other benefits and advantages of the invention will become apparent to those skilled in the art upon a reading and understanding of the following specification.

BRIEF DESCRIPTION OF DRAWINGS

The invention may take physical form in certain parts and arrangement of parts. A preferred embodiment of these parts will be discussed in detail in the specification and illustrated in the accompanying drawings, which form a part of this disclosure and wherein.

DETAILED DESCRIPTION OF THE INVENTION

Figure 1:
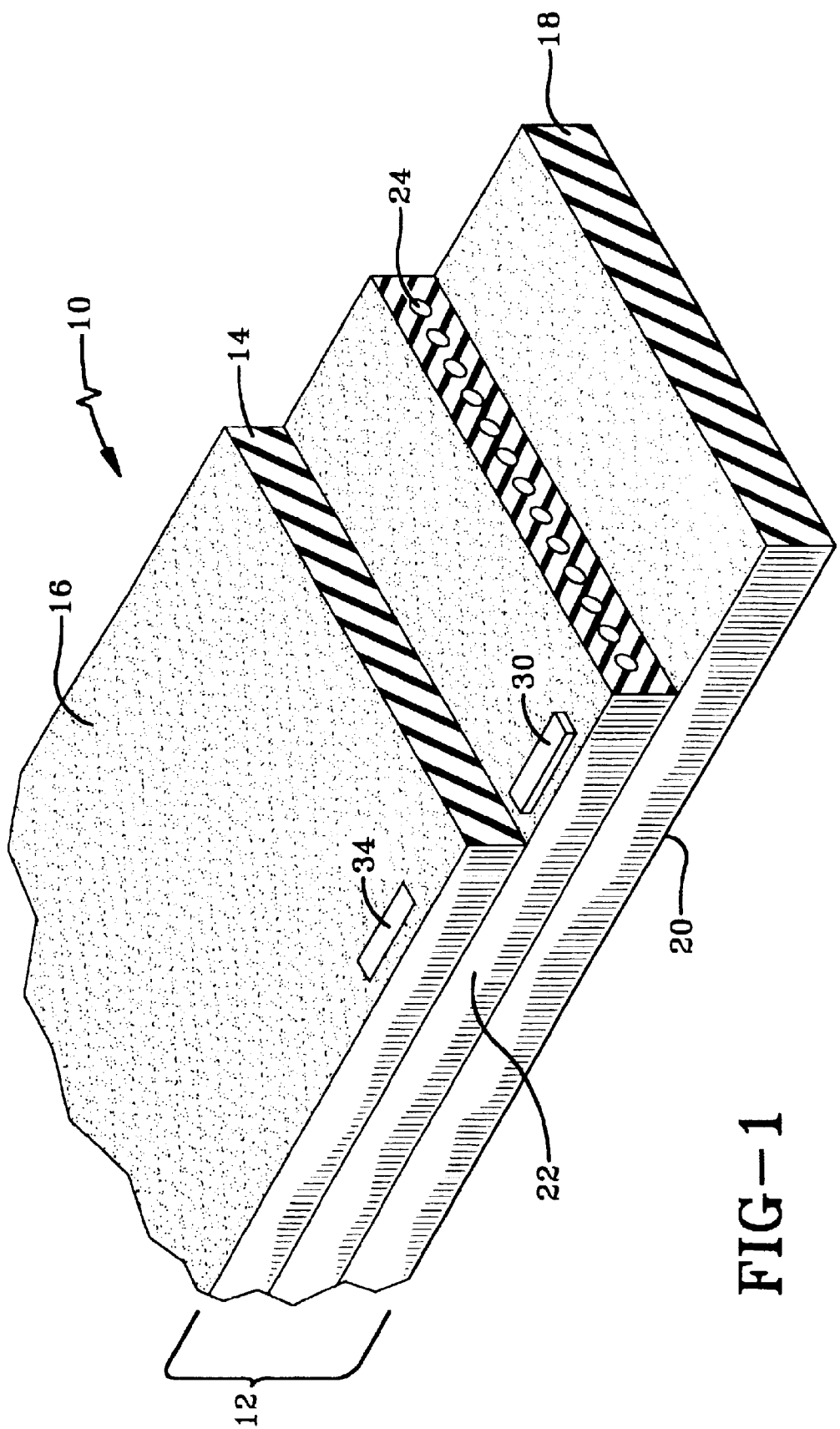
FIG. 1 is a perspective view, partly in section, of a conveyor belt having an embedded integrated circuit transponder according to the invention.

FIG. 1 is directed to a conveyor belt 10 comprising an elastomeric body 12 having a top cover 14, which includes a load-carrying surface 16, and a parallel pulley cover 18, which has a pulley-engaging surface 20. The conveyor belt also has at least one reinforced layer 22 disposed within the elastomeric body 12.

In a preferred embodiment, the reinforced layer 22 includes steel cables 24, although the present invention may be practiced in many types of reinforced conveyor belts including those reinforced with fabric, such as nylon, rayon, cotton, polyester, aramid, and others.

In accordance with the invention, one or more integrated circuit transponders 30 are embedded within the structure of the conveyor belt 10. The need to protect the embedded transponders 30 from the severe conditions of the belt's working environment and while simultaneously providing convenient access to the transponder 30 will determine the placement in a belt. One or more transponders 30 may be placed at predetermined positions along the length of the belt to indicate the presence of splices, rip detection coils, brand site and the like. In the art, it is usual to place a brand 34 on an edge of the conveyor belt 10. The brand 34 may be alphanumeric and normally contain information corresponding to the belt's manufacturing date, materials of construction used in the belt, equipment intended to be used with the belt, and the like. FIG. 1 shows an embedded integrated circuit transponder 30 located in the top cover 14 near the brand 34. Such a transponder 30 may emit data relating to the brand 34 upon interrogation.

Figure 2:
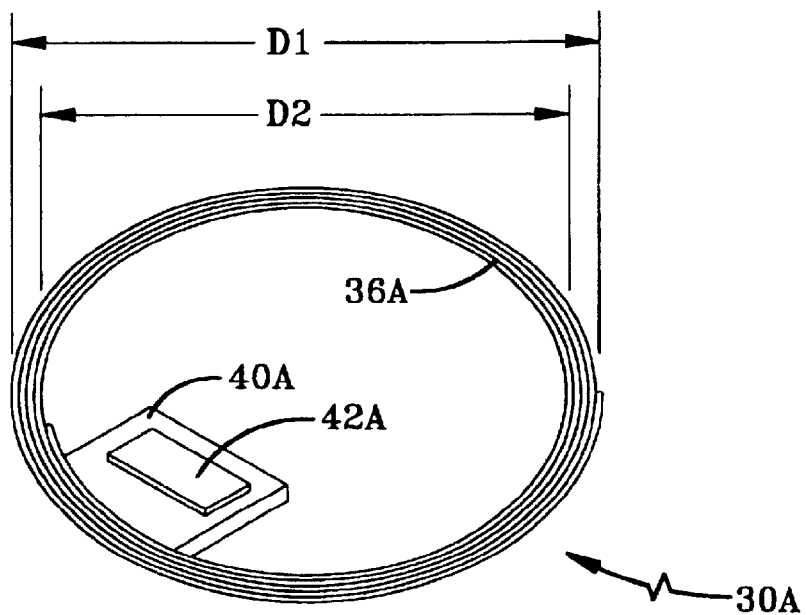
FIG. 2 is a perspective view of one embodiment of a transponder according to the invention.
Figure 3:
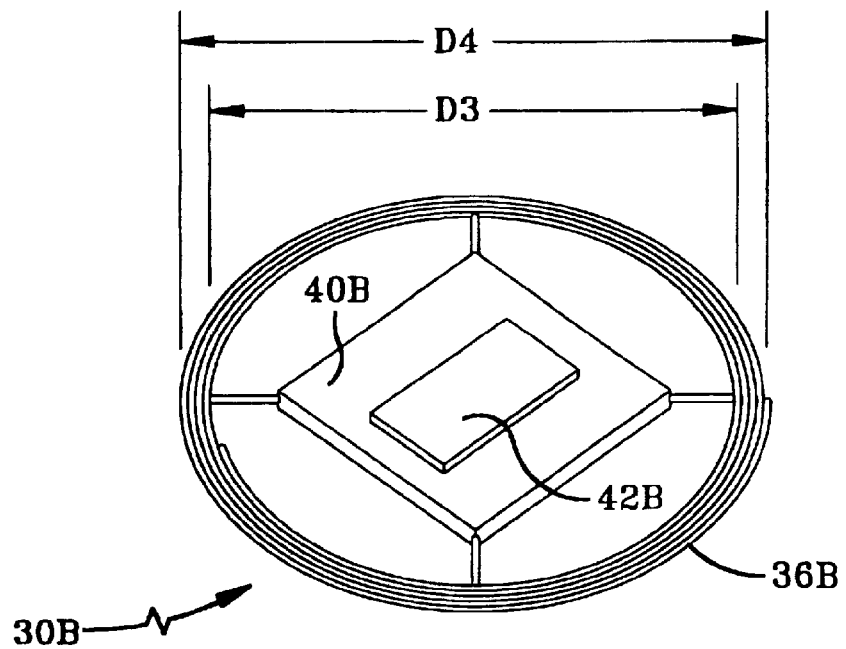
FIG. 3 is a perspective view of another embodiment of a transponder according to the invention.

With particular reference to FIGS. 2 and 3, the detailed structure of the embedded transponder 30 will be described. A preferred embodiment of the invention, shown in FIG. 2, utilizes a transponder 30A which is of a flat-ring style made of an electrical coil which is wound in a generally flat plane which serves as the antenna 36A. The number of windings of the transponder is a matter of engineering judgment depending on the application. The ring is preferably 1.5 mm to 2.0 mm thick and has an outer diameter D1 of between 45 mm and 60 mm and an inner diameter D2 of between 40 mm and 55 mm. However, coil length, width, turns and other characteristics may be varied according to the particular requirements of each application. The transponder 30A is embedded in the belt structure in a plane generally parallel with the belt surfaces 16, 20.

Attached to this antenna 36A is a printed circuit board 40A. The RF-ID integrated circuit 42A, hereinafter IC, is mounted onto the circuit board 40A. The IC 42A and board 40A are encased in a rigid epoxy material, such as is available from the Dexter Hysol Corporation under the trade name "Dexter Hyso 4322", while the antenna 36A itself is coated with a soft polymeric material, such as solderable polyester to NEMA standard MW-77-C. The preferred IC board 40A is approximately 8 mm square. The preferred antenna is presently manufactured from coated wire.

Another embodiment of the invention, shown in FIG. 3, utilizes a transponder 30B wherein both the IC board 40B and the antenna 36B are encapsulated with a rigid epoxy material, such as is available from the Dexter Hysol Corporation under the trade name "Dexter Hysol 4322." In this embodiment, the flat ring antenna 36B consists of an electrical coil wire wound in a flat plane having a thickness of from 1.5 mm to 2.0 mm with an outer diameter D4 of about 15 mm to 25 mm and an inner diameter D3 of about 8 mm to 18 mm. The IC board 40B is located in the center of the ring.

Both embodiments of the transponder 30A, 30B herein described are adhered to the rubber of the belt covers 14, 18, or to the rubber covering the reinforcement. A suitable epoxy or other adhesive, such as an adhesive available from the Lord Corporation under the trade name Chemloc 205, is used to prevent any possibility of a static charge arising from the transponder 30 due to rubber movement.

The function of the transponder 30 is similar to that which is disclosed in U.S. Pat. No. 5,181,975, the entire disclosure being incorporated herein by reference. An emitted RF signal is received by the transponder 30. The transponder 30 is powered by the signal and in turn emits a return RF signal which carries a data stream.

In one embodiment, the interrogation signal is provided via a hand held reader (not shown), The reader also acts as the receiver for the return RF signal. Alternately, the RF reader could be placed at some fixed location along a conveyor system. In a preferred embodiment, the input signal from the reader is at 125 KHz and the return signal is at 62.5 KHz.

Figure 4:
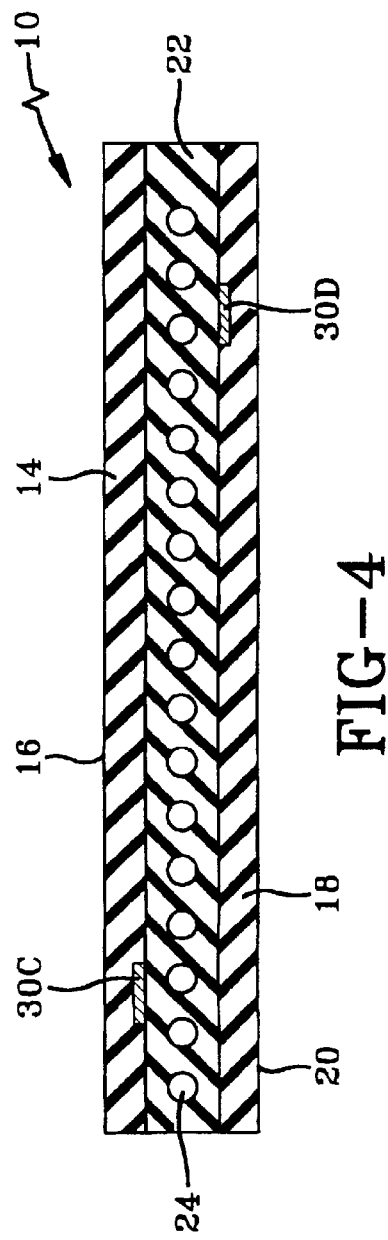
FIG. 4 is a transverse sectional view of a conveyor belt having a steel cable reinforced layer and two embedded transponders.

FIG. 4 shows a preferred embodiment of the invention utilizing a conveyor belt 10 having a steel cable-reinforced layer 22. Two transponders 30 are positioned within the belt 10. A first transponder 30C is located within the top cover 14 on the interface between the top cover 14 and the reinforced layer 22. A second transponder 30D is located on the interface between the pulley cover 18 and the reinforced layer 22. This configuration is advantageous because the first transponder 30C is protected from the load-carrying surface 16 and the second transponder 30D is protected from the pulley-engaging surface 20.

Figure 5:
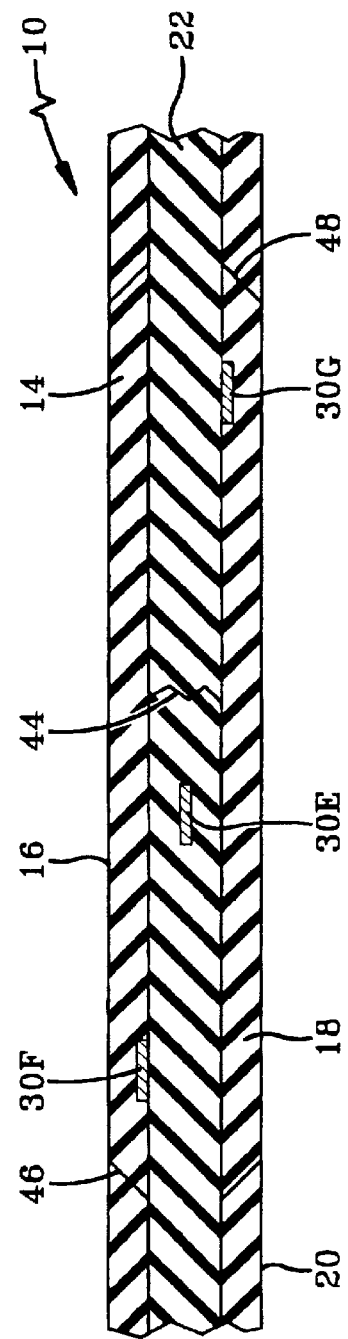
FIG. 5 is a side view of a splice in a reinforced conveyor belt having embedded transponders according to the invention.

FIG. 5 shows where the transponders 30 could be located in the event that the conveyor belt 10 contains a splice 44. A first transponder 30E is located in the reinforced layer 22 near a splice 44 therein. A second transponder 30F is embedded between the top cover 14 and the reinforced layer 22, near a splice 46 in the top cover 14. A third transponder 30G is located between the pulley cover 18 and the reinforced layer 22 near a splice 48 in the pulley cover 18. Upon interrogation, each of the transponders 30 is capable of emitting digitized data such as date of splice installation and type of material used in making the splice. By marking each splice 44, 46, 48, interrogation of the transponders 30 would provide immediate location and identification of the splice to permit monitoring of the repair. The transponders 30 are capable of being encoded with appropriate data such as date of installation, belt material utilized, and the like.

Figure 6:
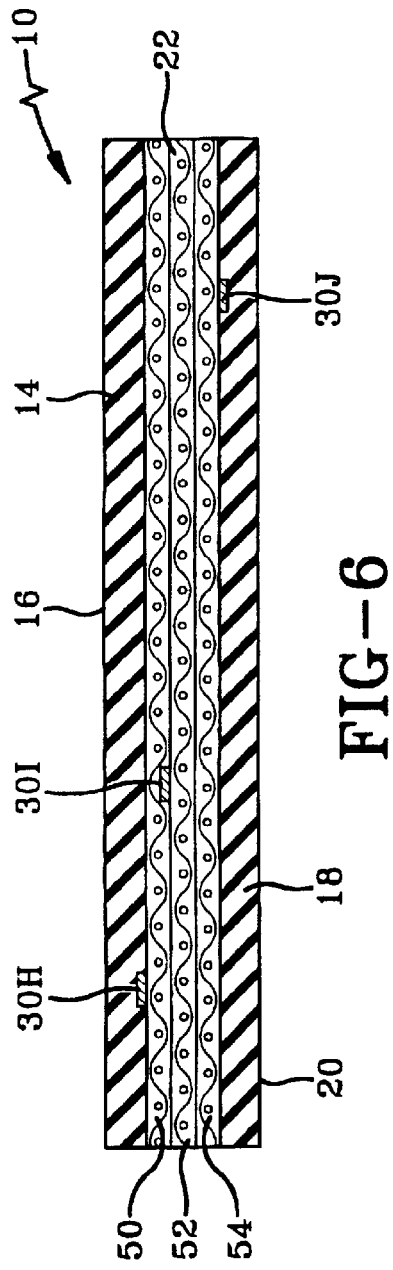
FIG. 6 is transverse sectional view of a textile belt having embedded transponders.

FIG. 6 shows another preferred embodiment of the invention utilizing a conveyor belt 10 having a fabric-reinforced layer 22. In the figure, the conveyor belt 10 again comprises a top cover 14 and a pulley cover 18. The reinforced layer 22 consists of three fabric plies 50, 52, 54, although other configurations are possible. In a preferred embodiment, one transponder 30H is located between the top cover 14 and the uppermost fabric ply 50. A second transponder 30I is located between the uppermost ply 50 and the middle ply 52. Alternately, the second transponder 30I could be located between the middle ply 52 and the lowermost ply 54. A third transponder 30J is located between the lowermost ply 54 and the pulley cover 18. The widthwise placement of the transponders 30 H,I,J is variable depending on the needs of the application.

Figure 7:
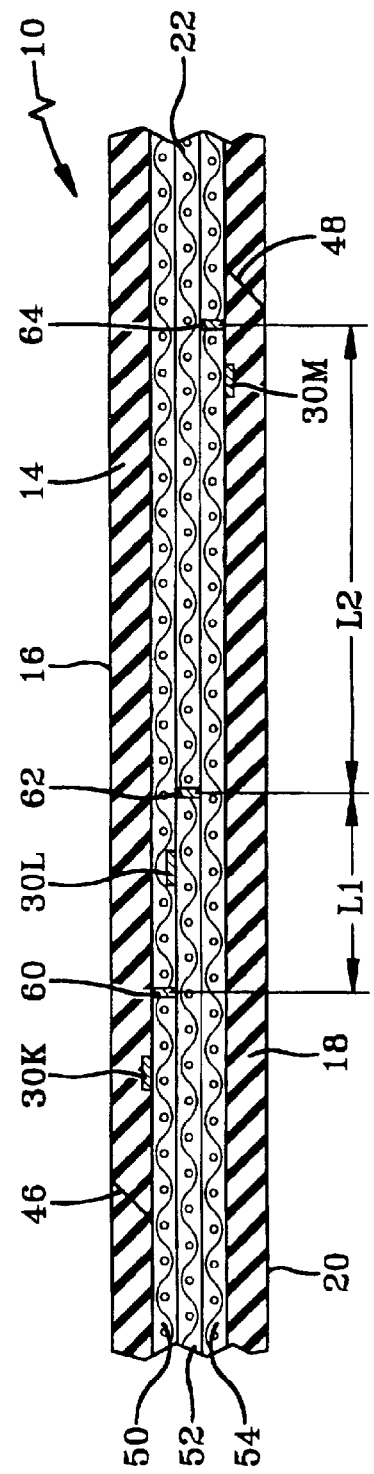
FIG. 7 is a side view of a splice in a textile belt having embedded transponders according to the invention.

FIG. 7 shows a preferred embodiment of the invention in a fabric-reinforced conveyor belt 10 which contains a splice. In a typical splice, the splices in each ply of the reinforced layer 22 are staggered along the length of the belt. For example, the splice 60 for the uppermost ply 50 is offset some length L1 from the splice 62 in the middle ply 52 which is itself offset some length L2 from the splice 64 in the lowermost ply 54. The splices 60, 62, 64 in the reinforced layer 22 are contained within segments of both the top cover 14 and pulley cover 18 which are spliced into the original belt. The positioning of transponders 30 within the spliced section will give precise locations for each of the splices 60, 62, 64 in the reinforced layer 22. A first transponder 30K is located between the top cover 14 and the uppermost ply 50 in close proximity to the splice 60 of the uppermost ply 50. A second transponder 30L is positioned between the uppermost ply 50 and the middle ply 52 (or between the middle ply 52 and the lowermost ply 54) in close proximity to the splice 62 of the middle ply 52. A third transponder 30M is positioned between the lowermost ply 54 and the pulley cover 18 in close proximity to the splice 64 in the lowermost ply 54. Again, the widthwise placement of the transponders 30 is variable.

The transponders 30 may be embedded in the belt structure during the belt manufacturing process, or added to a surface of a belt layer during a post-cure operation.

The present invention has been described with reference to the preferred embodiment. Obviously, modifications and alterations will occur to others upon a reading and understanding of the specification. It is intended by the applicant to include all such modifications and alterations insofar as they come within the scope of the appended claims or the equivalents thereof.

Having thus described the invention, it is now claimed:

1. An endless conveyor belt comprising:
   an elastomeric body having a top cover and a pulley cover, the top cover having an upper load-carrying surface and a lower inner surface, the pulley cover having a lower, pulley-engaging surface and an upper inner surface, a reinforced layer disposed between and coextensive with the top cover and the pulley cover and having a first splice therein characterized by:
   a first transponder, the first transponder being an integrated circuit, the first transponder being located within the structure of the belt in close proximity to the first splice so as to obtain information from the splice for belt identification the first transponder being able to transmit an electrical signal in response to an oscillating electric or magnetic field emanating from a source in contact with or spaced from the belt.

2. The conveyor belt of claim 1 wherein the first transponder is positioned within the top cover near the lower inner surface.

3. The conveyor belt of claim 1 further comprising:
   a second integrated circuit transponder, the second transponder being located within the structure of the belt for use in belt identification, said second and first transponder being positioned in staggered positions along a length of the belt, the second transponder being able to transmit an electrical signal in response to an oscillating electric or magnetic field emanating from a source in contact with or spaced from the belt.

4. The conveyor belt of claim 1 wherein the reinforced layer comprises a plurality of steel cables oriented along the lengthwise dimension of the belt.

5. The conveyor belt of claim 1 wherein the reinforced layer comprises a reinforced textile fabric.

6. The conveyor belt of claim 3 wherein the first transponder is positioned within the top cover near the lower inner surface, and the second transponder is positioned within the pulley cover near the upper inner surface.

7. The conveyor belt of claim 3 wherein the first and second transponders each comprise:
   an antenna comprising an electrical coil having a plurality of bunched turns, the coil being substantially planar, the plane of the coil being substantially parallel with the belt surfaces; and,
   a printed circuit board attached to the coil, the integrated circuit of each transponder being mounted on the circuit board.

8. The conveyor belt of claim 6 wherein the first transponder comprises:
   an antenna comprising an electrical coil having a plurality of bunched turns, the coil being substantially planar, the plane of the coil being substantially parallel with the belt surfaces; and,
   a printed circuit board attached to the coil, the integrated circuit of the first transponder being mounted on the circuit board.

9. The conveyor belt of claim 8, wherein the antenna further comprises a circular shape having an inner diameter between 40 mm to 55 mm, and outer diameter between 45 mm to 60 mm.

10. The conveyor belt of claim 8 wherein the first transponder further comprises a circular shape having an inner diameter between 8 mm to 18 mm, and outer diameter between 15 mm to 25 mm.

11. An endless conveyor belt, comprising
   an elastomeric body having a top cover and a pulley cover, the top cover having an upper load carrying surface and a lower inner surface, the pulley cover having a lower, pulley-engaging surface and an upper inner surface, a reinforced layer disposed between and coextensive with the top cover and the pulley cover, characterized by:
   a first transponder, the first transponder being an integrated circuit, the first transponder being located within the structure of the belt for use in belt identification, the first transponder being able to transmit an electrical signal in response to an oscillating electric or magnetic field emanating from a source in contact with or spaced from the belt;
   an antenna having a substantially circular shape with an inner diameter between substantially 40 mm to 55 mm and an outer diameter being substantially between 45 mm to 60 mm and comprising an electrical coil having a plurality of bunched turns, the coil being substantially planar, the plane of the coil being substantially parallel with the belt surfaces, the antenna being encased in soft polymeric material and the integrated circuit board is being encased in a rigid epoxy material; and
   a printed circuit board attached to the coil, the integrated circuit of the first transponder being mounted on the circuit board.

12. An endless conveyor belt, comprising
   an elastomeric body having a top cover and a pulley cover, the top cover having an upper load carrying surface and a lower inner surface, the pulley cover having a lower, pulley-engaging surface and an upper inner surface, a reinforced layer disposed between and coextensive with the top cover and the pulley cover, characterized by:

a first transponder, the first transponder being an integrated circuit, the first transponder being located within the structure of the belt for use in belt identification, the first transponder being able to transmit an electrical signal in response to an oscillating electric or magnetic field emanating from a source in contact with or spaced from the belt;

an antenna having a substantially circular shape with an inner diameter between substantially 40 mm to 55 mm and an outer diameter being substantially between 45 mm to 60 mm and comprising an electrical coil having a plurality of bunched turns, the coil being substantially planar, the plane of the coil being substantially parallel with the belt surfaces; and a printed circuit board attached to the coil, the integrated circuit of the first transponder being mounted on the circuit board, wherein the antenna and integrated circuit board are encased in a rigid epoxy material.

13. An endless conveyor belt having an elastomeric body having a top cover, a pulley cover, and a reinforced layer disposed between and coextensive with the top cover and the pulley cover, a splice in the top cover, a splice in the pulley cover and a first splice in the reinforced layer; the belt being characterized by:

a first integrated circuit transponder being located in the reinforced layer in close proximity to the first splice so as to obtain information from the splice for belt identification and monitoring, the first transponder being able to transmit an electrical signal (I) response to an oscillating electric or magnetic field emanating from a source in contact with or spaced from the belt, said first splice being in a staggered relationship along the length of the belt relative to said top cover splice and said pulley cover splice.

14. The conveyor belt of claim 13 further comprising a second integrated circuit transponder, the second transponder being located between the top cover and the reinforced layer in close proximity to the splice in the top cover.

15. The conveyor belt of claim 13 wherein the first transponder comprises an antenna comprising an electrical coil having a plurality of bunched turns, the coil being substantially planar, the plane of the coil being substantially parallel with the belt surfaces; and, a printed circuit board attached to the coil, the integrated circuit of the first transponder being mounted on the circuit board.

16. The conveyor belt of claim 13 wherein the antenna further comprises a circular shape having an inner diameter between 40 mm to 55 mm, and an outer diameter between 45 mm to 60 mm.

17. The conveyor belt of claim 14 further comprising a third integrated circuit transponder, the third transponder being located between the pulley cover and the reinforced layer in close proximity to the splice in the pulley cover.

18. The conveyor belt of claim 14 wherein the first and second transponders each comprise:

an antenna comprising an electrical coil having a plurality of bunched turns, the coil being substantially planar, the plane of the coil being substantially parallel with the belt surfaces; and, a printed circuit board attached to the coil, the integrated circuit of each transponder being mounted on the circuit board.

19. A method of locating a splice in a conveyor belt, the method characterized by the steps of:

embedding an integrated circuit transponder in the structure of the conveyor belt near the splice, the splice being the result of a post-cure operation, the transponder being able to transmit an electrical signal in response to an oscillating electric or magnetic field emanating from a source in contact with or spaced from the belt;

interrogating the transponder with the oscillating electric or magnetic field; and, receiving the transmitted electrical signal from the transponder.

20. A conveyor belt identification system characterized by:

a transducer embedded within the belt structure at any predetermined position along the belt length, the transducer being encoded with predetermined identification data, the transducer being able to transmit the data in response to an oscillating electric or magnetic field emanating from a source in contact with or spaced from the belt, the transducer being located in close proximity to a splice made during original manufacture or after a post-cure operation; and, means for receiving the transmitted identification data.

* * * * *